US009215649B2

(12) United States Patent
Barathalwar

(10) Patent No.: US 9,215,649 B2
(45) Date of Patent: Dec. 15, 2015

(54) TECHNIQUES FOR ASSISTED NETWORK ACQUISITION

(75) Inventor: Raguraman Barathalwar, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 175 days.

(21) Appl. No.: 13/997,204

(22) PCT Filed: Nov. 30, 2011

(86) PCT No.: PCT/US2011/062540
§ 371 (c)(1),
(2), (4) Date: Jun. 22, 2013

(87) PCT Pub. No.: WO2013/100887
PCT Pub. Date: Jul. 4, 2013

(65) Prior Publication Data
US 2014/0334335 A1    Nov. 13, 2014

(51) Int. Cl.
| | |
|---|---|
| H04W 48/16 | (2009.01) |
| H04W 48/18 | (2009.01) |
| H04W 64/00 | (2009.01) |
| H04W 48/20 | (2009.01) |
| H04W 48/10 | (2009.01) |

(52) U.S. Cl.
CPC .............. *H04W 48/16* (2013.01); *H04W 48/18* (2013.01); *H04W 64/003* (2013.01); *H04W 48/10* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 8,189,577 B2 | 5/2012 | Vaswani et al. | |
| 2004/0246922 A1* | 12/2004 | Ruan et al. | 370/331 |
| 2005/0090277 A1* | 4/2005 | Islam et al. | 455/525 |
| 2008/0049702 A1* | 2/2008 | Meylan et al. | 370/342 |
| 2008/0240039 A1* | 10/2008 | Parekh et al. | 370/331 |
| 2009/0094680 A1* | 4/2009 | Gupta et al. | 726/3 |
| 2009/0190553 A1* | 7/2009 | Masuda et al. | 370/331 |
| 2009/0221283 A1* | 9/2009 | Soliman | 455/426.1 |
| 2009/0265543 A1* | 10/2009 | Khetawat et al. | 713/151 |
| 2009/0280853 A1* | 11/2009 | Brisebois et al. | 455/522 |

(Continued)

OTHER PUBLICATIONS

International Search Report and Written Opinion received for PCT Patent Application No. PCT/US2011/062540, Mailed Jun. 27, 2013, 9 pages.

(Continued)

*Primary Examiner* — Chi H Pham
*Assistant Examiner* — Vladislav Agureyev
(74) *Attorney, Agent, or Firm* — Kacvinsky Daisak Bluni PLLC

(57) ABSTRACT

Techniques for assisted network acquisition are described. An apparatus may comprise a wireless transceiver, a processor circuit communicatively coupled to the wireless transceiver, and a memory unit communicatively coupled to the processor circuit, the memory unit to store a network locator application operative on the processor circuit to locate a network for a remote device. The network locator application may comprise a network detector component operative to receive network information for multiple wireless networks via the wireless transceiver, a network selector component operative to select a target network for the remote device from the multiple wireless networks based on the network information, and a network notifier component operative to send network configuration information for the target network to the remote device. Other embodiments are described and claimed.

17 Claims, 13 Drawing Sheets

(56) References Cited

U.S. PATENT DOCUMENTS

| | | | |
|---|---|---|---|
| 2010/0008259 A1* | 1/2010 | Yoon et al. | 370/254 |
| 2010/0067371 A1* | 3/2010 | Gogic et al. | 370/216 |
| 2010/0190502 A1* | 7/2010 | Qing et al. | 455/445 |
| 2010/0240371 A1* | 9/2010 | Cook et al. | 455/436 |
| 2011/0182252 A1* | 7/2011 | Liu et al. | 370/329 |
| 2011/0281574 A1* | 11/2011 | Patel et al. | 455/422.1 |
| 2011/0286437 A1* | 11/2011 | Austin et al. | 370/338 |

OTHER PUBLICATIONS

Murthy et al., "An Efficient Routing Protocol for Wireless Networks", Balzer Journals publisher of Science Publishers, (1996), 27 pages.

* cited by examiner

700

SCAN FOR NETWORK INFORMATION FROM MULTIPLE WIRELESS NETWORKS BY A LOCAL DEVICE ON BEHALF OF A REMOTE DEVICE
702

RECEIVE NETWORK INFORMATION FOR MULTIPLE WIRELESS NETWORKS AT THE LOCAL DEVICE
704

SELECT A TARGET NETWORK FOR A REMOTE DEVICE FROM THE MULTIPLE WIRELESS NETWORKS BASED ON THE NETWORK INFORMATION
706

SEND NETWORK CONFIGURATION INFORMATION FOR THE TARGET NETWORK FROM THE LOCAL DEVICE TO THE REMOTE DEVICE
708

COMPARE A RECEIVED NETWORK IDENTIFIER FOR A CANDIDATE WIRELESS NETWORK WITH A LIST OF NETWORK IDENTIFIERS FOR WIRELESS NETWORKS ACCESSIBLE BY THE REMOTE DEVICE
802

DETECT A MATCH BETWEEN THE RECEIVED NETWORK IDENTIFIER AND A NETWORK IDENTIFIER FROM THE LIST OF NETWORK IDENTIFIERS
804

SELECT A WIRELESS NETWORK CORRESPONDING TO THE MATCHED NETWORK IDENTIFIER AS THE TARGET NETWORK
806

DETECT A MATCH BETWEEN MULTIPLE RECEIVED NETWORK IDENTIFIERS AND MULTIPLE NETWORK IDENTIFIERS FROM A LIST OF NETWORK IDENTIFIERS ACCESSIBLY BY THE REMOTE DEVICE
*902*

ORDER THE MATCHED NETWORK IDENTIFIERS BY A SIGNAL STRENGTH IDENTIFIER FROM A STRONGEST SIGNAL STRENGTH TO A WEAKEST SIGNAL STRENGTH
*904*

SELECT A WIRELESS NETWORK CORRESPONDING TO THE MATCHED NETWORK IDENTIFIER HAVING A STRONGEST SIGNAL STRENGTH AS THE TARGET NETWORK
*906*

FIG. 9

TECHNIQUES FOR ASSISTED NETWORK ACQUISITION

BACKGROUND

Power management is a ubiquitous feature for electronic devices. In computing, for example, an Advanced Configuration and Power Interface (ACPI) specification provides an open standard for device configuration and power management by the operating system. When an electronic device is not being fully utilized by a user, power management techniques such as ACPI may be used to place the electronic device in various power states (or performance states), with each power state reducing or eliminating an amount of power provided to various components of the electronic device to reduce overall power consumption for the electronic device. However, once an electronic device is placed into a lower power state, certain components may no longer be operational, such as a wireless transceiver. This can be problematic whenever the electronic device needs to maintain a communication connection with another device to receive information. Furthermore, whenever a power state for the electronic device is increased thereby resuming power to a wireless transceiver, it may take a relatively long period of time for the wireless transceiver to become operational and re-establish a communication connection. It is with respect to these and other considerations that the present improvements have been needed.

BRIEF DESCRIPTION OF THE DRAWINGS

FIG. 7 illustrates an embodiment of a first logic flow.

FIG. 8 illustrates an embodiment of a second logic flow.

FIG. 9 illustrates an embodiment of a third logic flow.

DETAILED DESCRIPTION

Figure 1:
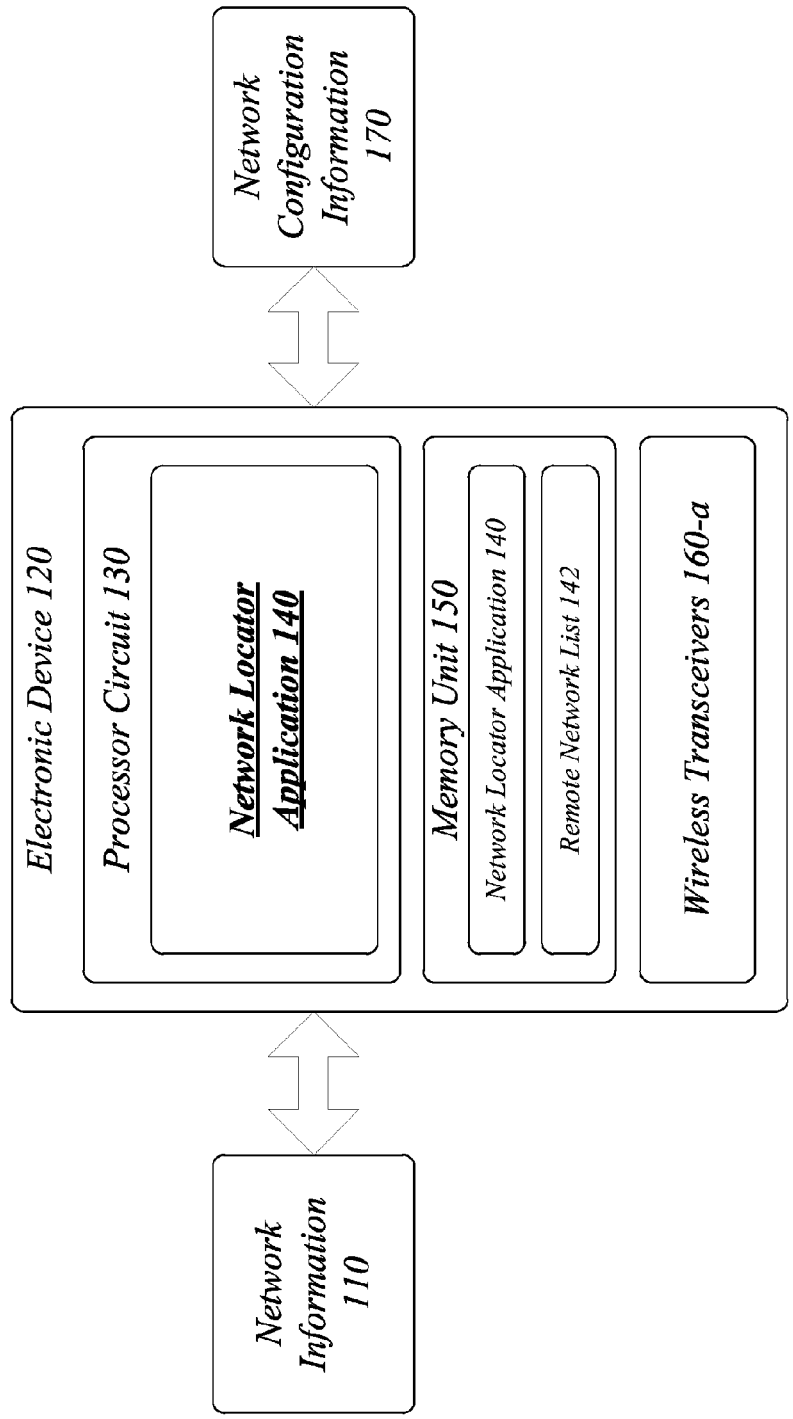
FIG. 1 illustrates an embodiment of a network locator apparatus.

Various embodiments are generally directed to managing communications connections for an electronic device. Some embodiments are particularly directed to techniques for assisted network acquisition. For example, a first electronic device may assist a second electronic device in locating and acquiring a network suitable for the second electronic device. An example of a first electronic device may comprise a smart phone, and an example of a second electronic device may comprise a desktop or notebook computer, among other examples.

The first and second devices may be designed to interoperate and communicate to allow the first device to act as a proxy or agent for the second device when the second device is in a lower power state. For instance, assume the second electronic device utilizes power management techniques to manage power consumption in accordance with ACPI power states (or performance states). When the second electronic device exits a fully operational power state (e.g., S0) and enters a lower power state (e.g., S1-S5) that affects operations of a wireless transceiver, the first electronic device may detect or receive notification of the lower power state of the second electronic device. The first electronic device may then initiate scans for wireless networks suitable for operation with the wireless transceiver of the second electronic device using a stored list of networks. The first electronic device may employ network selection logic to detected networks to select a network suitable for the second electronic device, retrieve network information for the selected network, and send the network information to the second electronic device. The second electronic device may receive the network information from the first electronic device, and store the network information for use when the second electronic device enters a higher power state (e.g., S0) to resume operations for the wireless transceiver. Upon entering the higher power state, the wireless transceiver may use the received network information to quickly and automatically connect to the selected network once the second electronic device enters the higher power state. The wireless transceiver may establish a communication connection to the network without having to undergo network scanning and selection operations normally performed by the wireless transceiver, thereby simulating an "instant on" feature for the second electronic device. In this manner, the wireless transceiver may rapidly acquire a communications connection when transitioning from a lower power state to a higher power state. As a result, the embodiments can improve affordability, scalability, modularity, extendibility, or interoperability for an operator, device or network.

Assisted network acquisition techniques provide significant advantages over conventional techniques. For instance, conventional solutions may include allowing a wireless transceiver for the second electronic device to scan and acquire a network once it enters a higher power state. As previously described, however, this delays network acquisition. Further, a memory unit for wireless transceivers is typically a limited resource, and therefore it can store a limited amount of network configuration information, network identifiers, and associated network information. The memory size limitation also prevents a wireless transceiver from implementing network selection logic of relative complexity. Offloading a network database and network selection logic to the first electronic device reduces or eliminates these disadvantages. Further, a user typically has multiple electronic devices in close proximity to each other, such as a smart phone and a notebook computer, making assisted network acquisition a lower cost alternative through efficient use of potentially available and underutilized resources.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a network locator apparatus 100. In one embodiment, the network locator apparatus 100 may comprise a computer-implemented apparatus comprising an electronic device 120 having a processor circuit 130, a memory unit 150, and a transceiver 160. The electronic device 120 may further have installed a network locator application 140 suitable for locating a network for a remote device. Although the network locator apparatus 100 shown in FIG. 1 has a limited number of elements in a certain topology, it may be appreciated that the network locator apparatus 100 may include more or less elements in alternate topologies as desired for a given implementation.

In various embodiments, the network locator apparatus 100 comprise an electronic device 120. Examples of an electronic device 120 may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

In various embodiments, the network locator apparatus 100 may comprise a processor circuit 130. The processing circuit 130 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 130.

In various embodiments, the network locator apparatus 100 may comprise a memory unit 150. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

In various embodiments, the network locator apparatus 100 may comprise one or more wireless transceivers 160-a. Each of the wireless transceivers 160-a may be implemented as physical wireless adapters or virtual wireless adapters, sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

It is worthy to note that "a" and "b" and "c" and similar designators as used herein are intended to be variables representing any positive integer. Thus, for example, if an implementation sets a value for a=5, then a complete set of wireless transceivers 160-a may include wireless transceivers 160-1, 160-2, 160-3, 160-4 and 160-5. The embodiments are not limited in this context.

The wireless transceivers 160-a may comprise or implement various communication techniques to allow the electronic device 120 to communicate with other electronic devices via a network. For instance, the wireless transceivers 160-a may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the electronic device 120 may implement different types of wireless transceivers 160-a. Each of the wireless transceivers 160-a may implement or utilize a same or different set of communication parameters to communicate information between various electronic devices. In one embodiment, for example, each of the wireless transceivers 160-a may implement or utilize a different set of communication parameters to communicate information between the electronic device 120 and a remote device. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the wireless transceivers 160-a. The embodiments are not limited in this context.

In various embodiments, the wireless transceivers 160-*a* may implement different communication parameters offering varying bandwidths, communications speeds, or transmission range. For instance, a first wireless transceiver 160-1 may comprise a short-range interface implementing suitable communication parameters for shorter range communications of information, while a second wireless transceiver 160-2 may comprise a long-range interface implementing suitable communication parameters for longer range communications of information.

In various embodiments, the terms "short-range" and "long-range" may be relative terms referring to associated communications ranges (or distances) for associated wireless transceivers 160-*a* as compared to each other rather than an objective standard. In one embodiment, for example, the term "short-range" may refer to a communications range or distance for the first wireless transceiver 160-1 that is shorter than a communications range or distance for another wireless transceiver 160-*a* implemented for the electronic device 120, such as a second wireless transceiver 160-2. Similarly, the term "long-range" may refer to a communications range or distance for the second wireless transceiver 160-2 that is longer than a communications range or distance for another wireless transceiver 160-*a* implemented for the electronic device 120, such as the first wireless transceiver 160-1. The embodiments are not limited in this context.

In various embodiments, the terms "short-range" and "long-range" may be relative terms referring to associated communications ranges (or distances) for associated wireless transceivers 160-*a* as compared to an objective measure, such as provided by a communications standard, protocol or interface. In one embodiment, for example, the term "short-range" may refer to a communications range or distance for the first wireless transceiver 160-1 that is shorter than 300 meters or some other defined distance. Similarly, the term "long-range" may refer to a communications range or distance for the second wireless transceiver 160-2 that is longer than 300 meters or some other defined distance. The embodiments are not limited in this context.

In one embodiment, for example, the wireless transceiver 160-1 may comprise a radio designed to communicate information over a wireless personal area network (WPAN) or a wireless local area network (WLAN). The wireless transceiver 160-1 may be arranged to provide data communications functionality in accordance with different types of lower range wireless network systems or protocols. Examples of suitable WPAN systems offering lower range data communication services may include a Bluetooth system as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

In one embodiment, for example, the wireless transceiver 160-2 may comprise a radio designed to communicate information over a wireless local area network (WLAN), a wireless metropolitan area network (WMAN), a wireless wide area network (WWAN), or a cellular radiotelephone system. The wireless transceiver 160-2 may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the wireless transceiver 160-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

In other embodiments, the wireless transceivers 160-1, 160-2 may implement a same set of communication parameters offering identical or substantially similar bandwidths, communications speeds, or transmission ranges. However, wireless transceivers 160-1, 160-2 may be utilized at different points in time. In another variant the electronic device 120 may implement a single wireless transceiver 160-3 utilized for different types of communications at different points in time, such as a single WiFi physical wireless adapter virtualized into multiple virtual wireless adapters. The embodiments are not limited in this context.

In the illustrated embodiment shown in FIG. 1, the processor circuit 130 may be communicatively coupled to the wireless transceivers 160-*a* and the memory unit 150. The memory unit 150 may store a network locator application 140 arranged for execution by the processor circuit 130 to locate a network for a remote device, such as another electronic device 120.

The network locator application 140 may be generally arranged to implement various assisted network acquisition techniques for remote devices. The term "remote device" and variations may refer to a class of electronic devices that are physically and structurally separate from the electronic device 120. In contrast, the electronic device 120 may be referred to as a "local device" relative to a remote device. In one embodiment, for example, the electronic device 120 may assist a remote device in locating and acquiring a network suitable for the remote device.

The network locator application 140 may allow the electronic device 120 to operate as a proxy or agent for one or more remote devices when the remote devices are in a lower power state. For instance, assume a remote device utilizes power management techniques to manage power consumption in accordance with ACPI power states. When the remote device exits a fully operational power state (e.g., S0) and enters a lower power state (e.g., S1-S5) that affects operations of a wireless transceiver for the remote device, the network locator application 140 may detect or receive notification of the lower power state of the remote device. The network locator application 140 may initiate scans for wireless networks suitable for operation with the wireless transceiver of the remote device using a remote network list 142 stored in memory unit 150. The network locator application 140 may receive network information 110 for available networks, employ network selection logic to the available networks to select a network suitable for the remote device, retrieve network configuration information 170 for the selected network, and send the network configuration information 170 to the remote device.

The remote device may receive the network configuration information 170 from the network locator application 140, and store the network configuration information 170 for use when the remote enters a higher power state (e.g., S0) to resume operations for the wireless transceiver. Upon entering the higher power state, the wireless transceiver may use the stored network configuration information 170 to quickly and automatically connect to the selected network once the remote device enters the higher power state.

Figure 2:
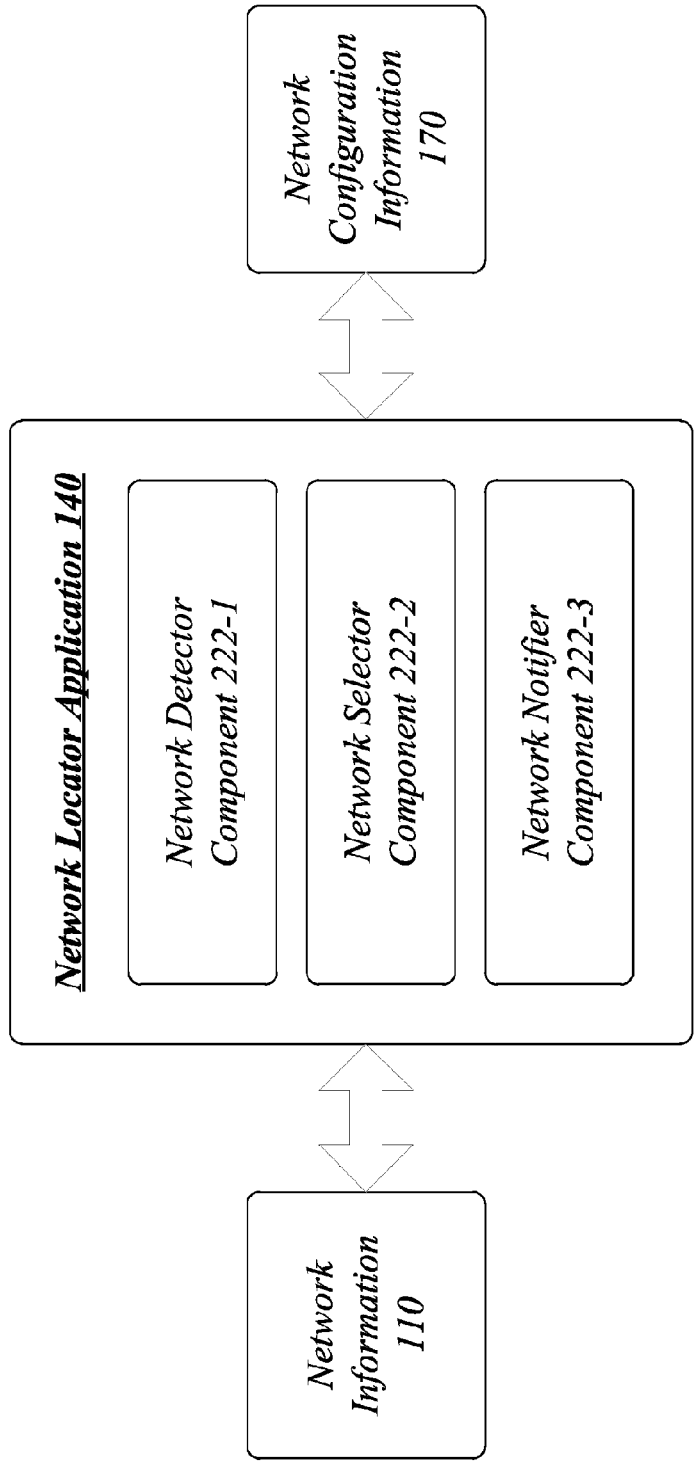
FIG. 2 illustrates an embodiment of a first operating environment for a network locator application.

FIG. 2 illustrates an embodiment of an operating environment 200 for the network locator apparatus 100. More particularly, the operating environment 200 may illustrate a more detailed block diagram for the network locator application 140.

The network locator application 140 may comprise various components 222-b. As used in this application, the term "component" is intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 2, the network locator application 140 may comprise a network detector component 222-1 generally arranged to monitor one or more remote devices and network devices within communication range of the electronic device 120 via the wireless transceivers 160-a, and receive network information 110 from the network devices on behalf of the remote devices. The network locator application 140 may further comprise a network selector component 222-2 generally arranged to select a target network for the remote device from among one or more available wireless networks based on the network information 110. The network locator application 140 may still further comprise a network notifier component 222-3 generally arranged to retrieve and send network configuration information 170 for the target network to the remote device for use in fast-acquisition of a network connection to the target network. Although the network locator application 140 shown in FIG. 2 has only three components in a certain topology, it may be appreciated that the network locator application 100 may include more or less components in alternate topologies as desired for a given implementation. The embodiments are not limited in this context.

Figure 3:
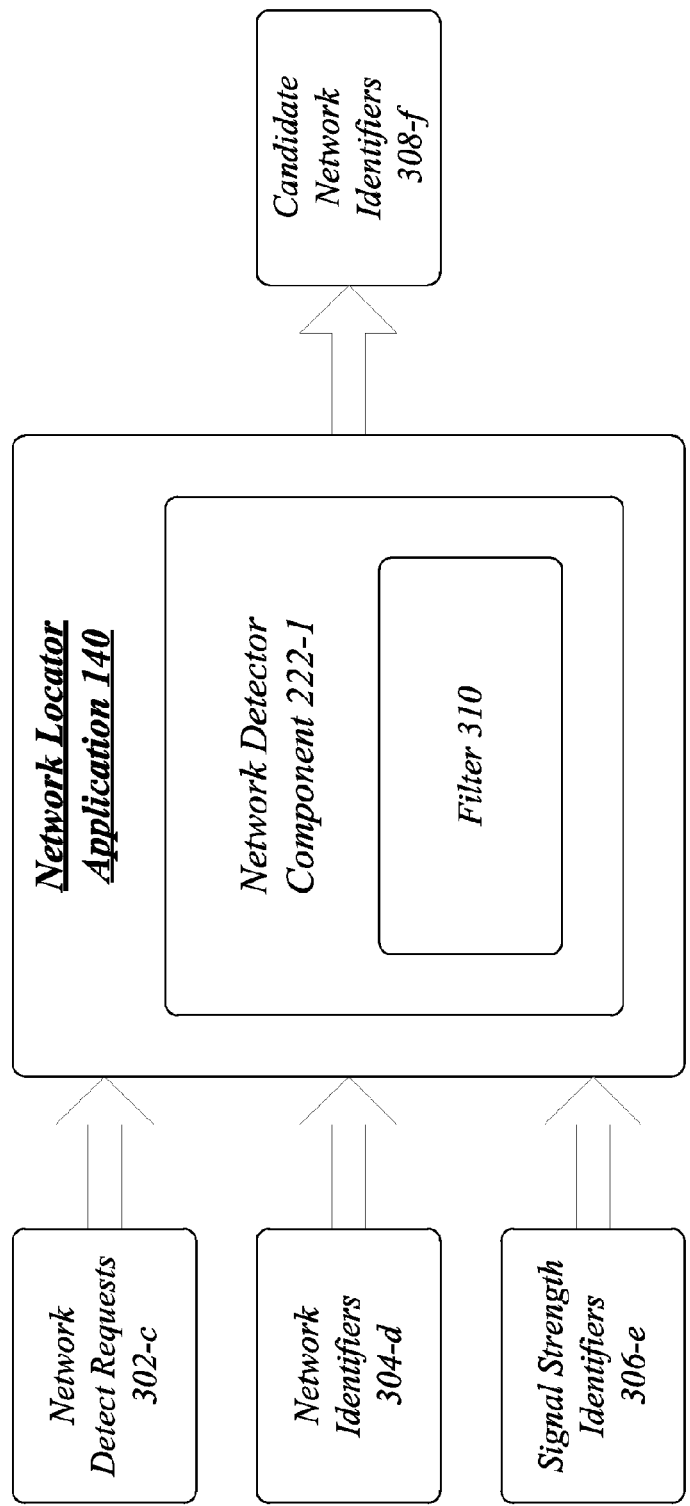
FIG. 3 illustrates an embodiment of a second operating environment for a network locator application.

FIG. 3 illustrates an embodiment of an operating environment 300 for the network locator apparatus 100. More particularly, the operating environment 300 may illustrate a more detailed block diagram for a network detector component 222-1 of the network locator application 140.

The network detector component 222-1 may be generally arranged to scan and receive as input network information 110 for multiple wireless networks via a wireless transceiver 160-a. The network detector component 222-1 may process the received network information 110, and output a set of candidate network identifiers 308-f to the network selector component 222-2 or the memory unit 150.

The network detector component 222-1 may monitor one or more remote devices to detect when a remote device enters a lower power state. For instance, the wireless transceivers 160-a of the electronic device 120 may include a first wireless transceiver 160-1 designed to communicate with a remote device, such as another electronic device 120. The first wireless transceiver 160-1 may be designed for short-range communications, such as a WPAN, WLAN or similar networks. The network detector component 222-1 may monitor one or more remote devices using the first wireless transceiver 160-1 for "heart-beat" messages sent at periodic intervals. When the network detector component 222-1 fails to detect a defined number of heart-beat messages, the network detector component 222-1 will set a flag indicating that the monitored remote device has entered a lower power state. Alternatively, the network detector component 222-1 may receive an explicit notification that a remote device has entered a lower power state. In one embodiment, for example, the network detector component 222-1 may receive a network detect request 302-c from a remote device indicating that the remote device has entered a lower power state. In yet another alternative, the network detector component 222-1 may continuously or periodically perform scanning operations on behalf of a remote device regardless of a current power state for the remote device.

Once the network detector component 222-1 determines that a remote device has entered a lower power state, the network detector component 222-1 may initiate detection operations to scan for one or more wireless networks for the remote device. For instance, the wireless transceivers 160-a of the electronic device 120 may include a second wireless transceiver 160-2 designed to communicate with a network device, such as a wireless access point for a network. The second wireless transceiver 160-2 may be designed for long-range communications, such as a WLAN, WMAN, WWAN, cellular radiotelephone network, or similar wireless networks. The network detector component 222-1 may utilize the second wireless transceiver 160-2 to monitor one or more network devices associated with a network to detect radio signals from network devices that are within a current transmission range or communications range of the electronic device 120.

During scanning operations, the network detector component 222-1 may receive as input network information 110 for various networks within communication range of a wireless transceiver 160-2 of the electronic device 120. The network information 110 may comprise any information encoded in the radio signals that uniquely identifies a network or a network device, such as a network name, a network identifier, a service set identifier (SSID), a basic service set identifier (BSSID), an independent basic service set identifier (IBSSI), an extended service set identifier (ESSID), a media access control (MAC) address, a network address, an Internet Protocol (IP) address, a domain name, a user name, an encryption scheme, a modulation scheme, an encoding scheme, pilot signals, pilot tones, capabilities information, metadata, and so forth. The embodiments are not limited in this context.

In one embodiment, the network detector component 222-1 may receive network information 110 comprising one or more network identifiers 304-*d* associated with one or more wireless networks via the wireless transceiver 160-2. In this case, the network detector component 222-1 may receive and enumerate a list of network identifiers 304-*d*, and send as output the entire list of network identifiers 304-*d* as a set of candidate network identifiers 308-*f* corresponding to one or more candidate wireless networks for a target network to the network selector component 222-2.

In one embodiment, the network detector component 222-1 may receive network information 110 comprising one or more network identifiers 304-*d* and signal strength identifiers 306-*e* associated with one or more wireless networks via the wireless transceiver 160-2. A signal strength identifier 306-*e* may comprise some form of statistical measurement of power present in a received radio signal, noise in a received radio signal, error rates in a received signal, ratios of a received signal, or other statistical measurement. Examples of signal strength identifiers 306-*e* may include without limitation a received signal strength indicator (RSSI), received channel power indicator (RCPI), signal-to-noise ratio (SNR) indicator, signal-to-noise plus interference ratio (SNIR) indicator, carrier-to-noise ratio (CNR) indicator, carrier-to-receiver noise density (C/kT) indicator, energy per bit to noise density (Eb/NO) indicator, energy per symbol to noise density (Es/NO) indicator, modulation error rate (MER) indicator, signal noise and distortion (SINAD) indicator, signal-to-interference ratio (SIR) indicator, signal-to-quantization-noise ratio (SQNR) indicator, and so forth. The embodiments are not limited in this context.

When the network detector component 222-1 receives network information 110 comprising both network identifiers 304-*d* and signal strength identifiers 306-*e* associated with one or more wireless networks via the wireless transceiver 160-2, the network detector component 222-1 may receive and enumerate a list of network identifiers 304-*d*, implement a filter 310 arranged to filter the list of network identifiers 304-*d* to form a set of candidate network identifiers 308-*f*, and send as output the set of candidate network identifiers 308-*f* corresponding to one or more candidate wireless networks for a target network to the network selector component 222-2.

The network detector component 222-1 may use the filter 310 to filter the network information 110 using different filter criteria or coefficients, such as a set of defined threshold values. The set of defined threshold values may be arranged to selectively reduce a set of network identifiers 304-*d* included within a set of candidate network identifiers 308-*f*. One example of a defined threshold value may comprise a defined RSSI threshold value. In an IEEE 802.11 system, RSSI is the relative received signal strength in a wireless environment, in arbitrary units. RSSI is an indication of a power level received by an antenna or antenna array for the wireless transceiver 160-2. Therefore, a higher RSSI number (or less negative in some devices) indicates a stronger radio signal, while a lower RSSI number indicates a weaker radio signal. The network detector component 222-1 may input a list of signal strength identifiers 306-*e* comprising RSSI values into the filter 310, the filter 310 may compare the list of RSSI values with a defined RSSI threshold value, and output a list of RSSI values at or above the defined RSSI threshold value. The network detector component 122-1 may then enumerate a list of candidate network identifiers 308-*f* comprising the network identifiers 304-*d* associated with the outputted list of RSSI values from the filter 310. Other defined threshold values may be used for other types of signal strength identifiers 306-*e*. Other defined threshold values may also be used for other types of filter criteria, such as defined threshold values representing a number of wireless networks (e.g., cut-off at 10 networks), a type of wireless network (e.g., only IEEE 802.11 networks), a subscriber identifier (e.g., only subscribed networks), an authentication identifier (e.g., only private networks), a security identifier (e.g., only non-encrypted networks), a permission identifier (e.g., only public networks), and other suitable filter criteria. The embodiments are not limited in this context.

Figure 4:
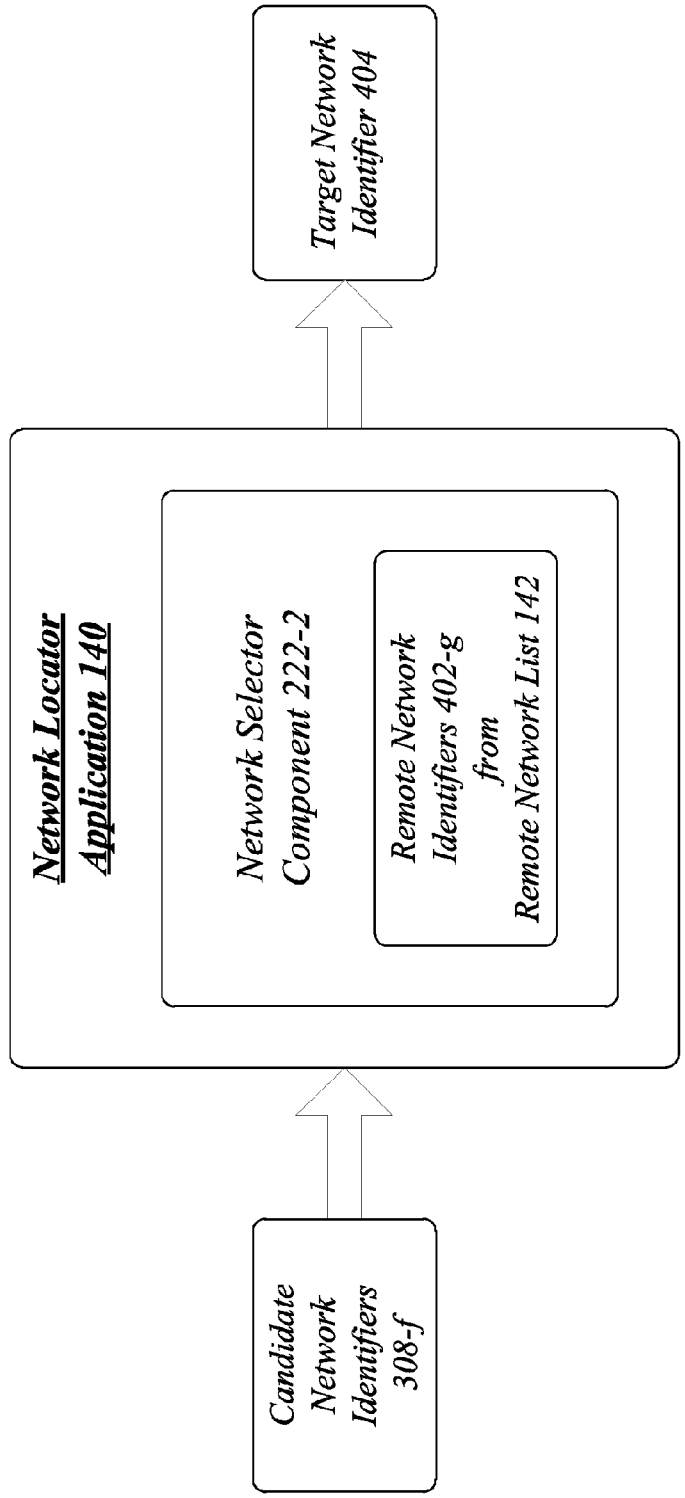
FIG. 4 illustrates an embodiment of a third operating environment for a network locator application.

FIG. 4 illustrates an embodiment of an operating environment 400 for the network locator apparatus 100. More particularly, the operating environment 400 may illustrate a more detailed block diagram for a network selector component 222-2 of the network locator application 140.

The network selector component 222-2 may be generally arranged to receive as input a set of candidate network identifiers 308-*f* from the network detector component 222-1. Alternatively, the network selector component 222-2 may retrieve a set of candidate network identifiers 308-*f* from the memory unit 150 as stored by the network detector component 222-1. In either case, the network selector component 222-2 may select a target network for a remote device from the list of candidate network identifiers 308-*f* representing multiple available wireless networks based on the network information 110. The network selector component 222-2 may then output a target network identifier 404 to the network notifier component 222-3 or the memory unit 150.

In one embodiment, the network selector component 222-2 may be arranged to select a target network based on a single selection criterion, such as matching network identifiers 308-*f*, 402-*g*. In this case, the network selector component 222-2 may receive one or more candidate network identifiers 308-*f* from the network detector component 222-1, compare the candidate network identifiers 308-*f* with remote network identifiers 402-*g* from the remote network list 142 representing wireless networks accessible by a remote device, detect a match between a candidate network identifier 308-*f* and a remote network identifier 402-*g*, and select a target network identifier 404 for a target network corresponding to the matched network identifiers. For example, assume the network selector component 222-2 receives a set of three candidate network identifiers 308-1, 308-2 and 308-3 from the network detector component 222-1. Further assume the network locator application 140 previously received and stored in the memory unit 150 a list of remote network identifiers 402-1, 402-2 representing wireless networks accessible by a remote device. The network selector component 222-2 may compare the three candidate network identifiers 308-1, 308-2 and 308-3 with the list of remote network identifiers 402-1, 402-2 to detect a match. Assume the candidate network identifier 308-1 matches the remote network identifier 402-1. The network selector component 222-2 may select a target network identifier 404 for a target network corresponding to the matched network identifiers 308-1, 402-1.

In one embodiment, the network selector component 222-2 may be arranged to select a target network based on multiple selection criteria, such as matching network identifiers 308-*f*, 402-*g* and associated signal strength identifiers 306-*e*. In this case, the network selector component 222-2 detects a match between multiple candidate network identifiers 308-*f* and multiple remote network identifiers 402-*g* accessible by a remote device, order the matched network identifiers 308-*f*, 402-*g* by signal strength identifiers 306-*e* from a strongest signal strength to a weakest signal strength, and select a target network identifier 404 for a target network corresponding to the matched network identifier 308-*f*, 402-*g* having a strongest signal strength. Continuing with our previous example, assume the network selector component 222-2 receives a set of three candidate network identifiers 308-1, 308-2 and 308-3 from the network detector component 222-1. Further assume the network locator application 140 received a list of remote network identifiers 402-1, 402-2 representing wireless networks accessible by a remote device. The network selector component 222-2 may compare the three candidate network identifiers 308-1, 308-2 and 308-3 with the list of remote network identifiers 402-1, 402-2 to detect a match. Assume the candidate network identifier 308-1 matches the remote network identifier 402-1, and the candidate network identifier 308-2 matches the remote network identifier 402-2. The network selector component 222-2 may order the matched network identifiers 308-1, 402-1 and 308-2, 402-2 by signal strength identifiers 306-1, 306-2 from a strongest signal strength to a weakest signal strength. Assume the signal strength identifier 306-2 is a RSSI value that is higher than a RSSI value for the signal strength identifier 306-1. The network selector component 222-2 may select a target network identifier 404 for a target network corresponding to the matched network identifiers 308-2, 402-2 having a strongest signal strength.

Figure 5:
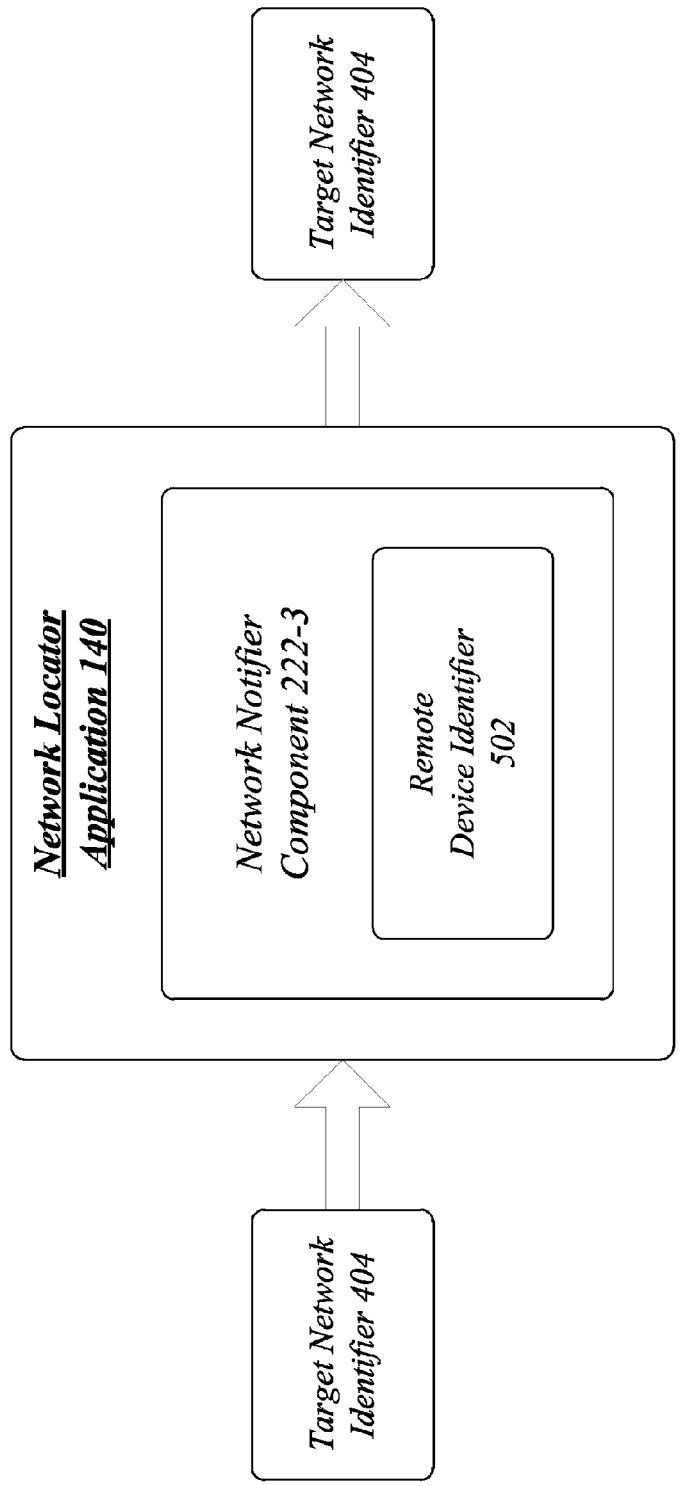
FIG. 5 illustrates an embodiment of a fourth operating environment for a network locator application.

FIG. 5 illustrates an embodiment of an operating environment 500 for the network locator apparatus 100. More particularly, the operating environment 500 may illustrate a more detailed block diagram for a network notifier component 222-3 of the network locator application 140.

The network notifier component 222-3 may be generally arranged to receive as input a target network identifier 404 from the network selector component 222-2 or the memory unit 150. The network selector component 222-2 may then send the target network identifier 404 to a remote device via the wireless transceiver 160-1.

In one embodiment, the network notifier component 222-3 may receive a target network identifier 404 from the network selector component 222-2, retrieve a remote device identifier 502 corresponding to a wireless connection to a remote device, initiate a wireless connection to the remote device using the remote device identifier 502, and send the target network identifier 404 to the remote device over the wireless connection as the network configuration information 170. For instance, assume the network notifier component 222-3 receives a target network identifier 404 representing the matched network identifiers 308-2, 402-2 having a strongest signal strength from the network selector component 222-2. Further assume the target network identifier 404 has been selected by the network locator application 140 for a remote device associated with the electronic device 120, such as a desktop computer owned by a same owner of the electronic device 120. The network notifier component 222-3 may retrieve a remote device identifier 502 corresponding to a wireless connection to the desktop computer, such as a WiFi SoftAP SSID for a WLAN between the electronic device 120 and the desktop computer. The network notifier component 222-3 may utilize the remote device identifier 502 to initiate a wireless connection to the desktop computer, and send the target network identifier 404 representing the matched network identifiers 308-2, 402-2 to the desktop computer over the wireless connection.

As described in more detail with reference to FIG. 6, a wireless transceiver (e.g., similar to wireless transceiver 160-2) for the desktop computer may use the target network identifier 404 to quickly establish a wireless connection to the wireless network associated with the target network identifier 404 when it exits from a lower power state and enters a higher power state providing power to the wireless transceiver. The wireless transceiver for the desktop computer can establish the wireless connection without performing its own network scanning and selection operations, thereby reducing latency and costs associated with such operations.

As shown and described with reference to FIG. 11, the electronic device 120 may further comprise a touch-screen display communicatively coupled to the processor circuit 130. The touch-screen display may receive user control directives to configure the network locator application 140, and present various graphical user interface (GUI) views for the network locator application 140. For instance, the GUI views may be used to subscribe a remote device to network assist services offered by the network locator apparatus 100, configure user preferences, a remote device identifier 502, and so forth.

Figure 6A:
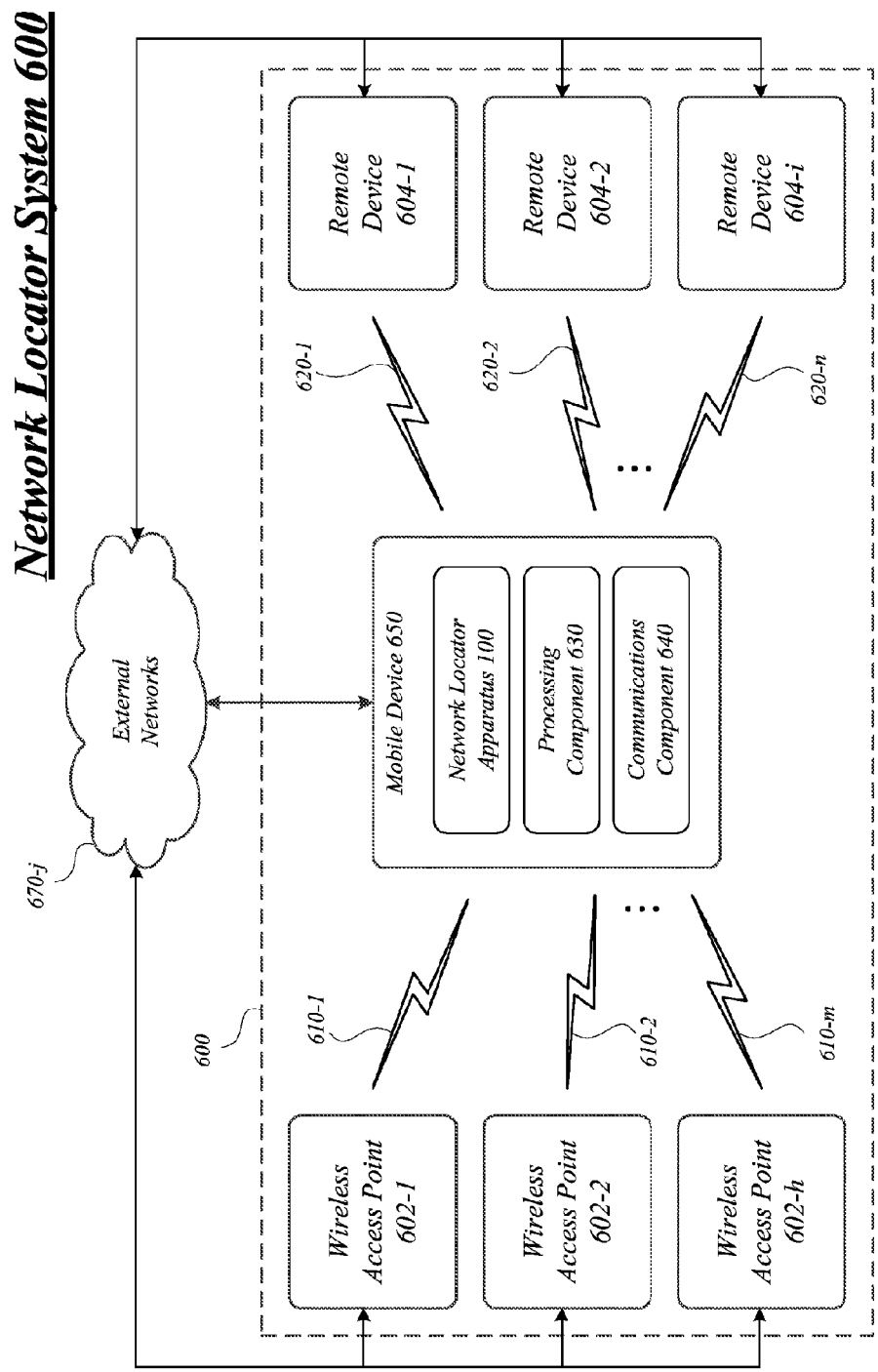
FIG. 6A illustrates an embodiment of a network locator system.

FIG. 6A illustrates an embodiment of a network locator system 600. The network locator system 600 illustrates a network diagram with network elements and devices suitable for implementing the network locator apparatus 100.

In the illustrated embodiment shown in FIG. 6A, the network locator system 600 may include a mobile device 650. The mobile device 650 may comprise an exemplary implementation for the electronic device 120. The mobile device 650 may comprise any portable electronic device having computing capabilities, communications capabilities, and a portable power source such as a battery. Examples for the mobile device 650 may include without limitation an ultra-mobile device, a mobile computing device, a smart phone, a handheld computer, a tablet computer, a remote control, a gaming device, a consumer electronic device, and so forth. The embodiments are not limited in this context.

The mobile device 650 may execute processing operations or logic for the network locator apparatus 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. An example for the processing component 630 may include the processing circuit 130 as described with reference to FIG. 1. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The mobile device 650 may execute communications operations or logic for the network locator apparatus 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media **610-*m*, 620-*n* may be implemented as wired communications media and/or wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. An example for the communications component 640 may include the wireless transceivers 160-*a***, although other implementations similar to those described above may work as well. The embodiments are not limited in this context.

The mobile device 650 may communicate with one or more wireless access points **602-*h* via the communications component 640 over the communications media 610-*m*. A wireless access point 602-*h* is a network device that allows wireless devices to connect to a wired network using IEEE 802.11 (WiFi), IEEE 802.15 (WPAN), IEEE 802.16 (WiMAX), Wireless Gigabit Alliance (WiGig), IEEE 802.20 (Mobile Broadband Wireless Access), or related standards. The wireless access point 602-*h* usually connects to a router via a wired network shown as one of the external networks 670-*j*, and can relay data between the wireless devices such as the mobile device 650 and wired devices on the external network 670-*j***.

The mobile device 650 may also communicate with one or more remote devices **604-*i*. As previously described, a remote device 604-*i* is any electronic device that is physically and structurally separate from the mobile device 650. More particularly, remote device 604-*i* may comprise an electronic device with computing capabilities, communications capabilities, and power management capabilities. A remote device 604-*i* may optionally have mobile capabilities, such as a portable power supply. Examples for a remote device 604-*i* may include the same examples as given for the mobile device 650. Examples for a remote device 604-*i*** may further include without limitation a desktop computer, a laptop computer, a notebook computer, a server computer, a workstation computer, a consumer electronic device, and so forth. The embodiments are not limited in this context.

In one embodiment, for example, the mobile device 650 may assist a remote device **604-*i* in locating and acquiring a network suitable for the remote device 604-*i*. The remote device 604-*i* may include power management capabilities that allow some or all of the processing component 630 and/or the communications component 640** to be placed in different power states (or performance states), with each power state consuming a different amount of power from a power supply, such as a battery or AC main power supply.

In one embodiment, for example, the remote device **604-*i*** may implement an operating system-directed configuration and power management (OSPM) system to implement power management operations compliant with an ACPI standard, such as the ACPI Specification, Revision 4.0a, published on Apr. 5, 2010 ("ACPI Specification"), its progeny, revisions and variants. The ACPI Specification defines seven global states for an ACPI-compliant computer system, as shown in Table 1 as follows:

TABLE 1

| Global State | Power Conservation Measure |
|---|---|
| G0 (S0) | Working |
| G1 (S1-S4) | Sleeping |
| G1: S1 | Hardware maintains all system context. |
| G1: S2 | Processor and system cache context is lost. |
| G1: S3 | All system context is lost except system memory. |
| G1: S4 | Hardware platform power off all devices. Platform context is maintained. |
| G2 (S5) | Soft Off |
| G3 | Mechanical Off |

Although some embodiments are described using ACPI power management techniques, it may be appreciated that any power management techniques allowing different power states and/or performance states may be implemented by a remote device **604-*i***. The embodiments are not limited in this context.

The mobile device 650 may provide network assistance services to one or more remote devices **604-*i*. By way of example, assume a remote device 604-1 subscribes to network assistance services provided by the network locator apparatus 100 implemented by the mobile device 650 directly over communications media 620-1 using the communications component 640 (e.g., the wireless transceiver 160-1). Alternatively, the remote device 604-1 may perform subscription operations with the mobile device 650 indirectly via one or more external networks 670-*j*, such as a private network (e.g., an enterprise intranet), a public network (e.g., the Internet), a public switched telephone network (PSTN), and so forth. During subscription operations, the remote device 604-1 may send a list of remote network identifiers 402-1, 402-2 and 402-3 representing wireless networks to which the remote device 604-1** can establish a network connection.

Once subscribed, the network locator apparatus 100 may begin monitoring the remote device 604-1 to detect when the remote device 604-1 enters a power state that turns off its wireless transceiver, such as the S3 power state, for example. Alternatively, the remote device 604-1 may generate and send a network detect request 302-1 prior to entering the S3 power state. The mobile device 650 may then begin scanning for one or more wireless access points **602-*h* corresponding to the remote network identifiers 402-1, 402-2 and 402-3 using the communications component 640 (e.g., the wireless transceiver 160-2), select a suitable wireless access point 602-1 matching a network identifier 402-1 and retrieve network configuration information 170 for the wireless access point 602-1 (e.g., a SSID) using the processing component 630, and send the network configuration information 170 to the remote device 604-1 via the communications component 640. The remote device 604-1 may receive the network configuration information 170, and use the network configuration information 170 to connect to the wireless access point 602-1** once it enters the S0 power state.

Figure 6B:
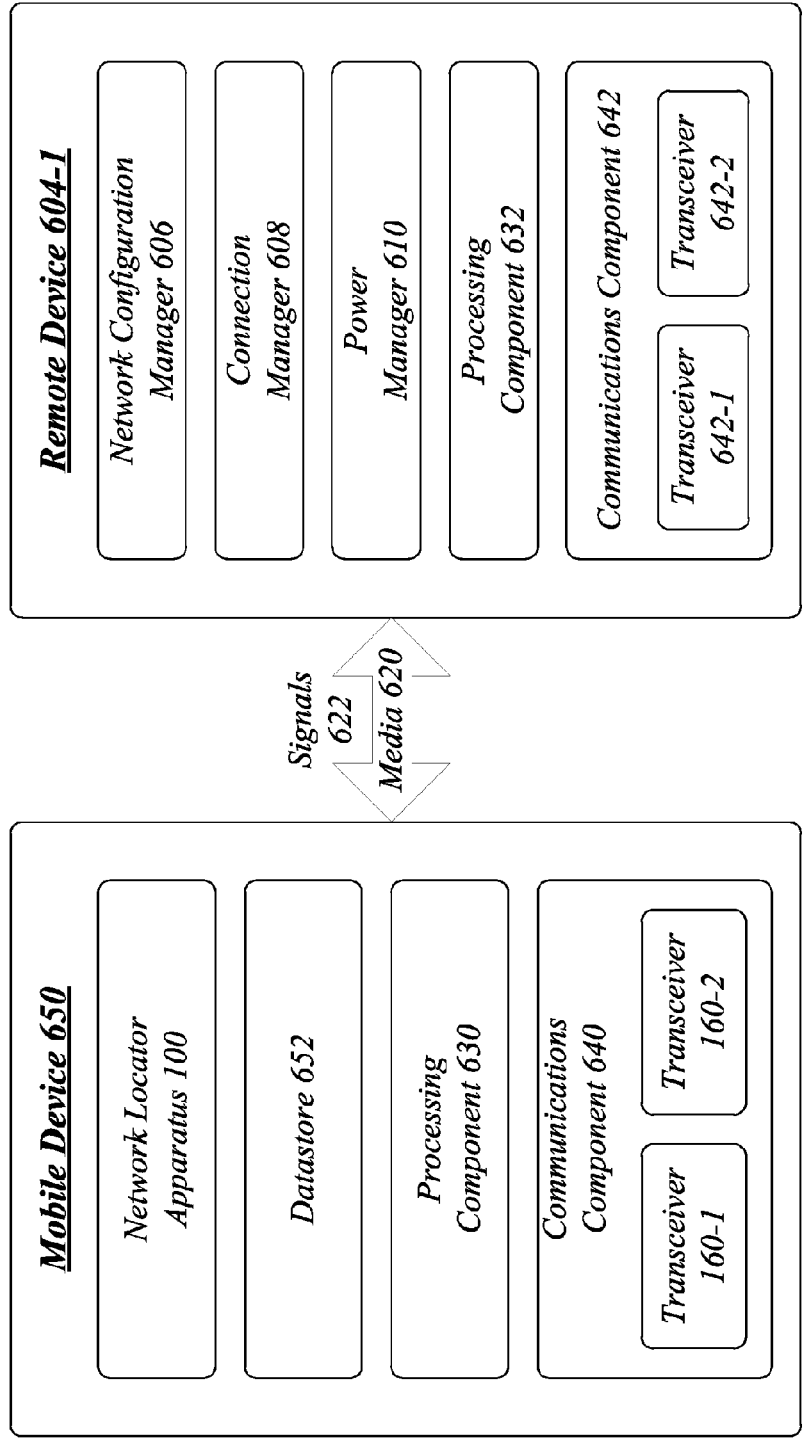
FIG. 6B illustrates an embodiment of a network locator system.

FIG. 6B illustrates an embodiment of a network locator system 600. FIG. 6B illustrates a more detailed block diagram for the remote device 604-1 as described with reference to FIG. 6A. It may be appreciated that the example given for the remote device 604-1 may be implemented for other remote devices **604-2 . . . 602-*h***.

As shown in FIG. 6B, the remote device 604-1 may include a processing component 632 and a communications component 642 similar to the processing component 630 and the communications component 640, respectively, as described with reference to FIG. 6A. Further, the communications component 642 may include two wireless transceivers 642-1, 642-2 similar to the wireless transceivers 160-1, 160-2, respectively, as described with reference to FIG. 6A. In addition, the remote device 604-1 may further include a network configuration manager 606 and a connection manager 608.

The network configuration manager 606 may be generally arranged to configure the wireless transceiver 642-1 of the remote device 604-1 to communicate with the wireless transceiver 160-1 of the mobile device 650. For instance, the network configuration manager 606 may store a network identifier for the mobile device 650, such as a WiFi SoftAP SSID, in a memory for the transceiver 642-1 prior to the remote device 604-1 entering a S3 power state.

The network locator apparatus 100 may scan and retrieve one or more wireless access points 602-$h$ corresponding to the remote network identifiers 402-1, 402-2 and 402-3 using the wireless transceiver 160-2, select a suitable wireless access point 602-1 matching a network identifier 402-1, and retrieve network configuration information 170 for the wireless access point 602-1 (e.g., a SSID) using the wireless transceiver 160-2. The network locator apparatus 100 may then send the network configuration information 170 to the remote device 604-1 via the wireless transceiver 160-1.

The remote device 604-1 may periodically scan and matches its scan list with the known SSID programmed into the memory of the wireless transceiver 642-1. When there is a match on the known SSID, the wireless transceiver 642-1 may send a control directive to a power manager 610 to instruct the remote device 604-1 to transition from a lower power state (e.g., S3) to a higher power state (e.g., S0).

The power manager 610 is generally arranged to manage power states or performance states for the remote device 604-1. The power manager 610 may be communicatively coupled to a power supply for the remote device 604-1, such as a battery or AC main. As previously described, the power manager 610 may implement an ACPI-compliant system or some other suitable power management technique. Upon receiving a control directive from the wireless transceiver 642-1, the power manager 610 may instruct the remote device 604-1 to transition from a lower power state (e.g., S3) to a higher power state (e.g., S0).

The connection manager 608 may be generally arranged to manage network connections for the remote device 604-1. Once the remote device 604-1 enters a higher power state (e.g., S0), the connection manager 608 may receive the network configuration information 170 via the wireless transceiver 642-1. The connection manager 608 may use the network configuration information 170 to connect to the wireless access point 602-1 using the wireless transceiver 642-2.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein. For example, the logic flow 700 may illustrate operations performed by the network locator apparatus 100.

In the illustrated embodiment shown in FIG. 7, the logic flow 700 may scan for network information from multiple wireless networks by a local device on behalf of a remote device at block 702. For example, the network detector component 222-1 of the network locator application 140 may scan for network information 110 from multiple wireless networks by the electronic device 120 (or mobile device 650) on behalf of a remote device 604-$i$ using the wireless transceiver 160-2. The network detector component 222-1 may initiate scanning operations for network information 110 from multiple wireless networks in response to a network detect request 302-$c$ from the remote device 604-$h$.

The logic flow 700 may receive network information for multiple wireless networks at a local device at block 704. For example, the network detector component 222-1 may receive network information 110 for available wireless networks within communication range of the electronic device 120 via the wireless transceiver 160-2. The network information 110 may comprise network identifiers 304-$d$ and signal strength identifiers 306-$e$ each representing a different wireless access point 602-$h$ which is a hardware-based wireless access point to a wired network, such as an external network 670-$j$.

The logic flow 700 may select a target network for a remote device from the multiple wireless networks based on the network information at block 706. For example, the network selector component 222-2 may select a target network for a remote device 604-$i$ from the multiple wireless networks based on the network information 110. The target network may comprise a network to which the remote device can connect as reflected in a remote network list 142.

The logic flow 700 may send network configuration information for the target network from the local device to the remote device at block 708. For example, the network notifier component 222-3 may retrieve and send network configuration information 170 for the target network from the electronic device 120 to the remote device 604-$i$ via the wireless transceiver 160-1. For example, the network notifier component 222-3 may retrieve a SSID for the target network, and send the SSID as the network configuration information 170 for the target network from the electronic device 120 to the remote device 604-$i$.

FIG. 8 illustrates one embodiment of a logic flow 800. The logic flow 800 may be representative of some or all of the operations executed by one or more embodiments described herein. For example, the logic flow 800 may illustrate operations performed by the network locator apparatus 100. More particularly, the logic flow 800 may provide more detailed operations to select a target network at block 706 of the logic flow 700 as described with reference to FIG. 7.

In the illustrated embodiment shown in FIG. 8, the logic flow 800 may compare a received network identifier for a candidate wireless network with a list of network identifiers for wireless networks accessible by the remote device at block 802. For example, the network selector component 222-2 may compare a received network identifier 304-$d$, such as network identifier 304-1, for a candidate wireless network with a list of remote network identifiers 402-$g$ for wireless networks accessible by the remote device 604-$i$ stored in the remote network list 142.

The logic flow 800 may detect a match between the received network identifier and a network identifier from the list of network identifiers at block 804. For example, the network selector component 222-2 may detect a match between the received network identifier 304-1 and a remote network identifier 402-1 from the list of network identifiers.

The logic flow 800 may select a wireless network corresponding to the matched network identifier as the target network at block 806. For example, the network selector component 222-2 may select a wireless network corresponding to the matched network identifiers 304-1, 402-1 as the target network.

FIG. 9 illustrates one embodiment of a logic flow 900. The logic flow 900 may be representative of some or all of the operations executed by one or more embodiments described herein. For example, the logic flow 900 may illustrate operations performed by the network locator apparatus 100. More particularly, the logic flow 900 may provide alternate detailed operations to select a target network at block 706 of the logic flow 700 as described with reference to FIG. 7.

In the illustrated embodiment shown in FIG. 9, the logic flow 900 may detect a match between multiple received network identifiers and multiple network identifiers from a list of network identifiers accessibly by the remote device at block 902. For example, the network selector component 222-2 may detect a match between multiple received network identifiers 304-1, 304-2 and multiple remote network identifiers 402-1, 402-2, respectively, from a list of network identifiers 402-g accessibly by the remote device 604-i.

The logic flow 900 may order the matched network identifiers by a signal strength identifier from a strongest signal strength to a weakest signal strength at block 904. For example, the network selector component 222-2 may order the matched network identifiers by signal strength identifiers 306-1, 306-2 associated with the network identifiers 304-1, 304-2, respectively, from strongest signal strength to weakest signal strength. For instance, assume a network corresponding to network identifier 304-2 has a strongest signal strength based on the signal strength identifier 306-2.

The logic flow 900 may select a wireless network corresponding to the matched network identifier having a strongest signal strength as the target network at block 906. For example, the network selector component 222-2 may select a wireless network corresponding to the matched network identifiers 304-2, 402-2 having a strongest signal strength as the target network for the remote device 604-i.

Figure 10:
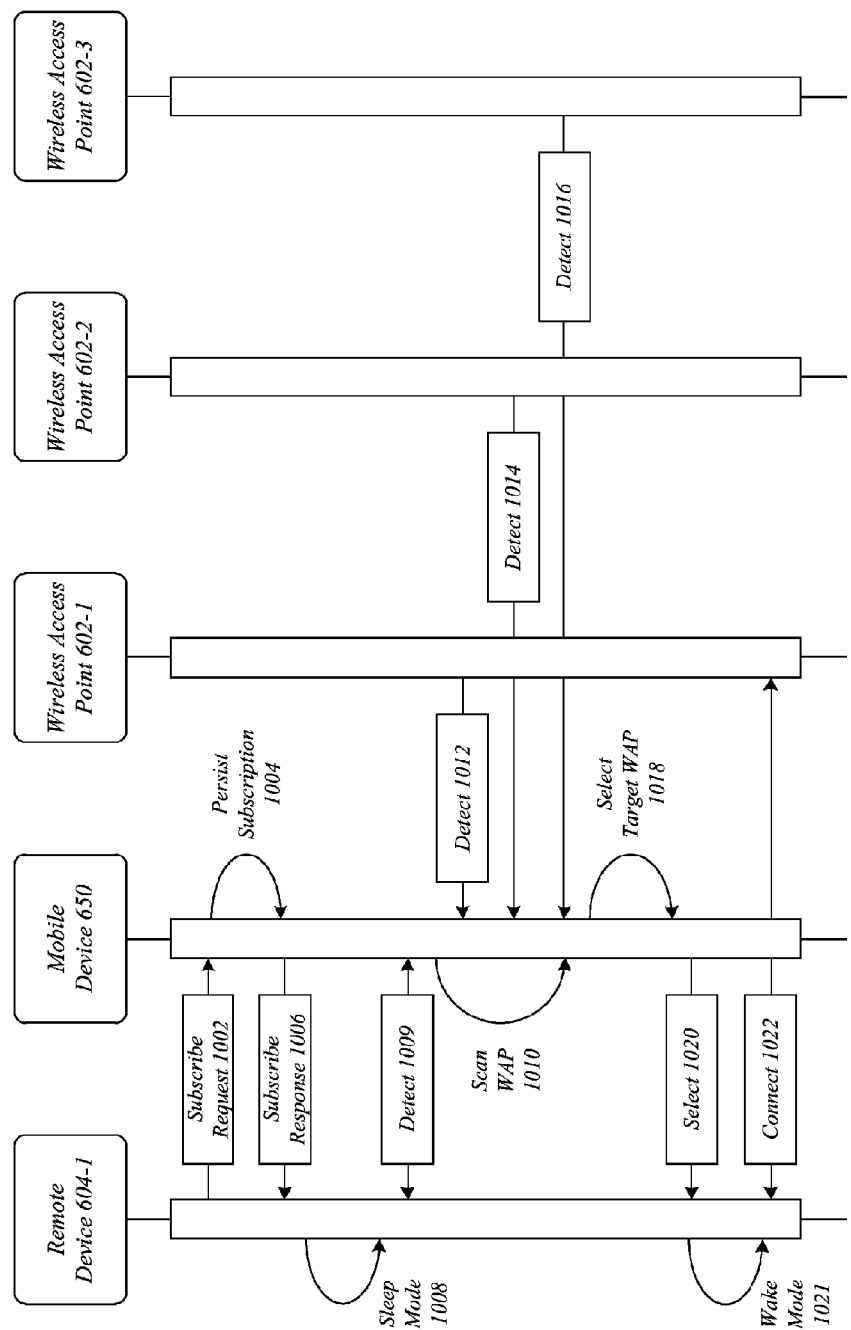
FIG. 10 illustrates an embodiment of a message flow.

FIG. 10 illustrates an embodiment of a message flow 1000. The message flow 1000 represents an exemplary flow of messages between various electronic devices comprising part of the network locator system 600.

In the illustrated embodiment shown in FIG. 10, a remote device 604-1 may send a subscribe request message 1002 to subscribe to network assistance services provided by the network locator apparatus 100 of the mobile device 650. The network locator apparatus 100 may subscribe the remote device 604-1 to the network assistance services, and issue a persist subscription message 1004 to persist the subscription 1004 in a datastore 652 of the mobile device 650. The mobile device 650 may send a subscribe response message 1006 with a WiFi SoftAP SSID for the wireless transceiver 160-1.

The network configuration manager 606 of the remote device 604-1 may receive the subscribe response 1006, and store the WiFi SoftAP SSID in a memory unit for the remote device 604-1. At some point, the power manager 610 may issue a sleep mode message 1008 to place the remote device 604-1 in a lower power state. The network configuration manager 606 may notify the network locator apparatus 100 of the mobile device 650 of the transition to a lower power state by sending a detect message 1009, which is representative of a network detect request 302-c, for example.

The network locator apparatus 100 may initiate scan operations and detect receipt of radio signals from the wireless access points 602-1, 602-2 and 602-3 as represented by detect messages 1012, 1014 and 1016, respectively. The network locator apparatus 100 may select one of the wireless access points 602-1, 602-2 and 602-3 as a target wireless access point 1018 corresponding to a target network for the remote device 604-1, and retrieve network configuration information 170 for the target wireless access point 1018. For instance, assume the target wireless access point 1018 is selected as the wireless access point 602-1. The network locator apparatus 100 may send a select message 1020 with the network configuration information 170 for the wireless access point 602-1 to the remote device 604-1.

The remote device 604-1 may receive the select message 1020 with the network configuration information 170, and the power manager 610 may issue a wake mode message 1021 to place the remote device 604-1 in a higher power state. Alternatively, the wireless transceiver 642-1 may periodically scan for the WiFi SoftAP SSID for the mobile device 650, and when found, issue the wake mode message 1021 and retrieve the network configuration information 170 from the mobile device 650 at that point. Once the remote device 604-1 is in a higher power state and has access to the network configuration information 170 for the wireless access point 602-1, the connection manager 608 of the remote device 604-1 may send a connect message 1022 to establish a network connection between the remote device 604-1 and the wireless access point 602-1 using conventional techniques.

Figure 11:
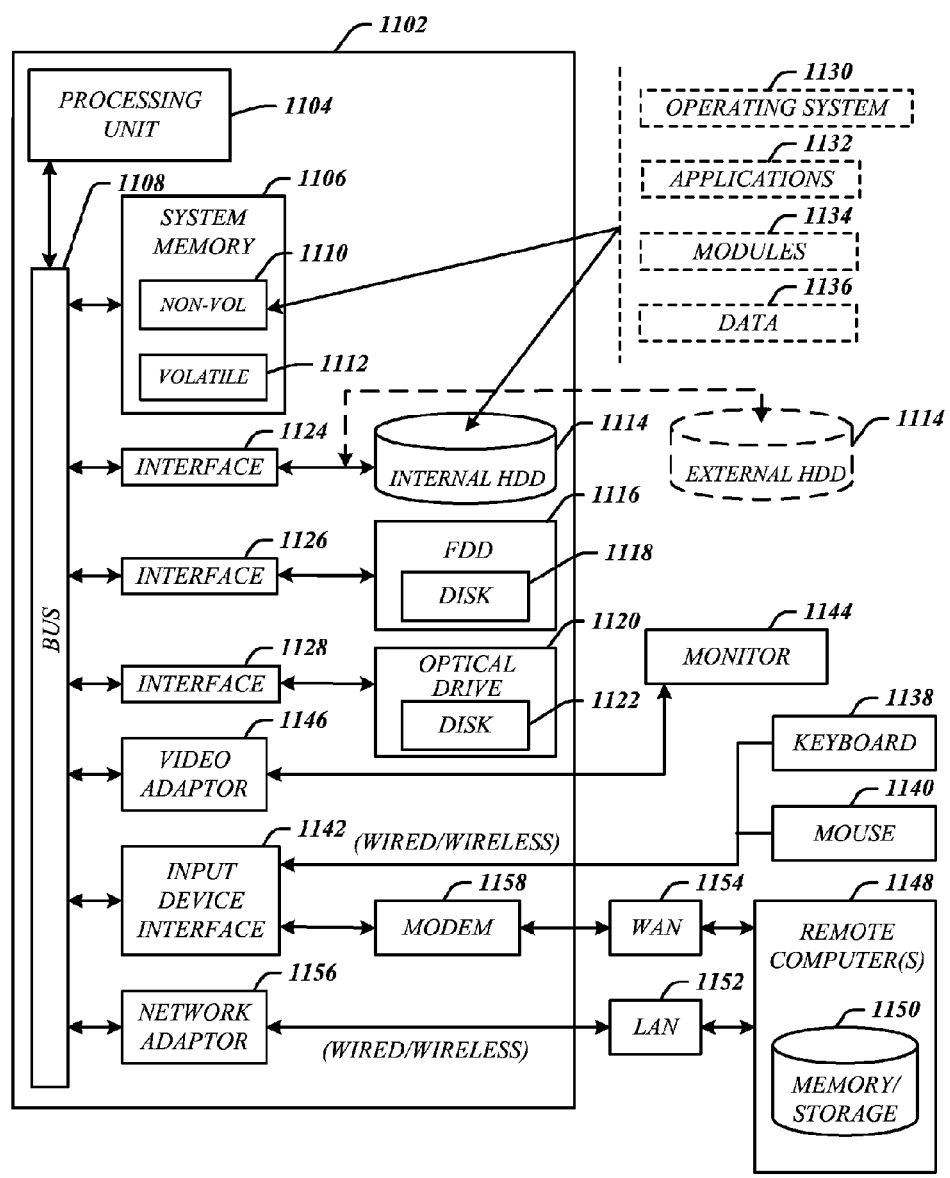
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIGS. 1, 6A and 6B, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

Figure 12:
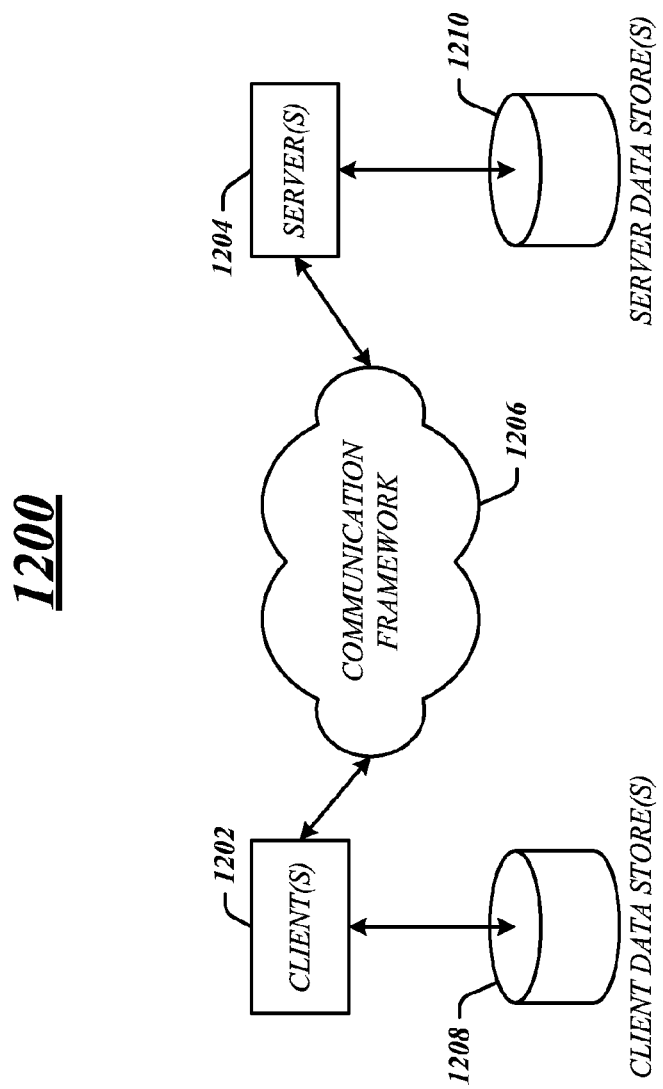
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a wireless transceiver;
a processor circuit communicatively coupled to the wireless transceiver; and
a memory unit communicatively coupled to the processor circuit, the memory unit to store a network locator application operative on the processor circuit to locate a network for a remote device, the network locator application comprising:
a network detector component operative to receive network information for multiple wireless networks via the wireless transceiver;
a network selector component operative to select a target network for the remote device from the multiple wireless networks based on the network information, receive one or more candidate network identifiers from the network detector component, compare the candidate network identifiers with a list of remote network identifiers representing wireless networks accessible by the remote device, detect a match between a candidate network identifier and a remote network identifier, and select a target network identifier for the target network corresponding to the matched network identifiers; and
a network notifier component operative to send network configuration information for the target network to the remote device.

2. The apparatus of claim 1, the network detector component operative to receive a network detect request to initiate detection operations for one or more wireless networks for the remote device.

3. The apparatus of claim 1, the network detector component operative to receive as input network information comprising a network identifier and a signal strength identifier for one or more wireless networks via the wireless transceiver.

4. The apparatus of claim 1, the network detector component operative to filter the network information using a set of defined threshold values, and send as output one or more candidate network identifiers corresponding to one or more candidate wireless networks for the target network.

5. The apparatus of claim 1, the network selector component operative to detect a match between multiple candidate network identifiers and multiple remote network identifiers accessible by the remote device, order the matched network identifiers by a signal strength identifier from a strongest signal strength to a weakest signal strength, and select the target network identifier for the target network corresponding to the matched network identifier having a strongest signal strength.

6. The apparatus of claim 1, the network notifier component operative to receive the target network identifier from the network selector component, retrieve a remote device identifier corresponding to a wireless connection to the remote device, initiate a wireless connection to the remote device using the remote device identifier, and send the target network identifier to the remote device over the wireless connection as the network configuration information.

7. The apparatus of claim 1, comprising a touch-screen display communicatively coupled to the processor circuit, the touch-screen display operative to receive user control directives to configure the network locator application, and present graphical user interface (GUI) views for the network locator application.

8. The apparatus of claim 1, the target network comprising an IEEE 802.11 wireless local area network.

9. A computer-implemented method, comprising
receiving, by a wireless transceiver, network information for multiple wireless networks at a local device;
selecting, by a processor circuit, a target network for a remote device from the multiple wireless networks based on the network information;
comparing a received network identifier for a candidate wireless network with a list of network identifiers for wireless networks accessible by the remote device;
detecting a match between the received network identifier and a network identifier from the list of network identifiers;
selecting a wireless network corresponding to the matched network identifier as the target network; and
sending network configuration information for the target network from the local device to the remote device.

10. The computer-implemented method of claim 9, comprising receiving network information comprising a network identifier and a signal strength identifier for multiple wireless networks via a wireless transceiver.

11. The computer-implemented method of claim 9, comprising scanning for network information from multiple wireless networks in response to a network detect request from the remote device.

12. The computer-implemented method of claim 9, comprising:
detecting a match between multiple received network identifiers and multiple network identifiers from the list of network identifiers accessibly by the remote device;
ordering the matched network identifiers by a signal strength identifier from a strongest signal strength to a weakest signal strength; and
selecting a wireless network corresponding to the matched network identifier having a strongest signal strength as the target network.

13. The computer-implemented method of claim 9, comprising:
retrieving a service set identifier (SSID) for the target network; and
sending the SSID as the network configuration information for the target network from the local device to the remote device.

14. A non-transitory storage medium containing instructions that when executed cause a system to:
receive one or more network identifiers for multiple wireless networks;
select a target network for a remote device from the multiple wireless networks based on the one or more network identifiers
compare the received network identifiers with a list of network identifiers for wireless networks accessible by the remote device;
detect a match between a received network identifier and a network identifier from the list of network identifiers;
select a wireless network corresponding to the matched network identifier as the target network; and
send a network identifier for the target network to the remote device.

15. The non-transitory storage medium of claim 14, comprising instructions that when executed cause the system to scan for network identifiers from multiple wireless networks in response to a network detect request from the remote device.

16. The non-transitory storage medium of claim 14, comprising instructions that when executed cause the system to:

detect a match between multiple received network identifiers and multiple network identifiers from the list of network identifiers accessibly by the remote device;

order the matched network identifiers by a signal strength identifier from a strongest signal strength to a weakest signal strength; and select a wireless network corresponding to the matched network identifier having a strongest signal strength as the target network.

17. The non-transitory storage medium of claim 14, comprising instructions that when executed cause the system to send a service set identifier (SSID) for the target network as the network identifier from the local device to the remote device.

* * * * *